March 30, 1954      E. A. BUCKLEY      2,673,705
ADJUSTABLE SUPPORTING ARRANGEMENT FOR SIGHTABLE
INSTRUMENTS IN A MOVING VEHICLE
Filed Nov. 30, 1950      2 Sheets-Sheet 1
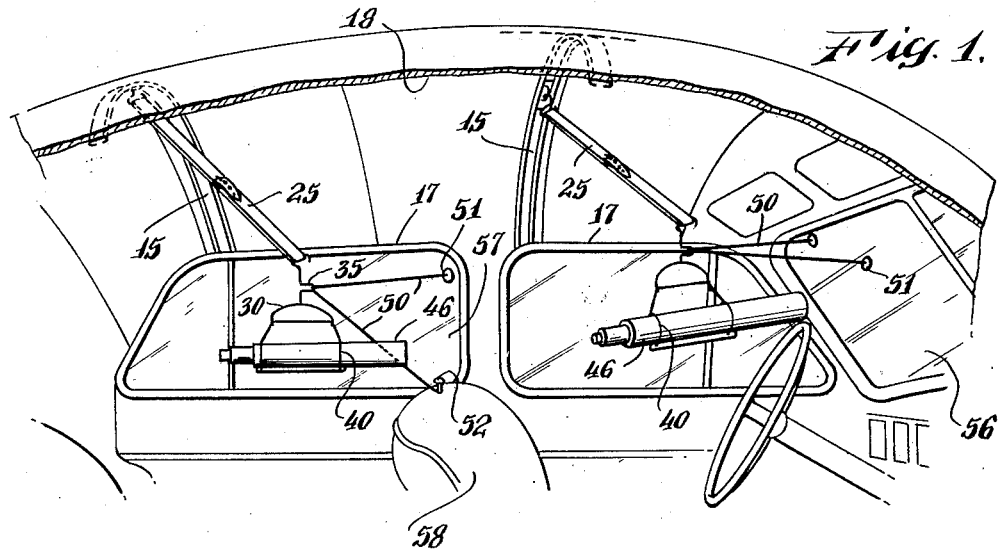
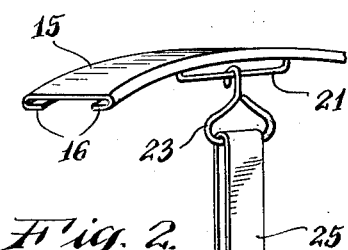
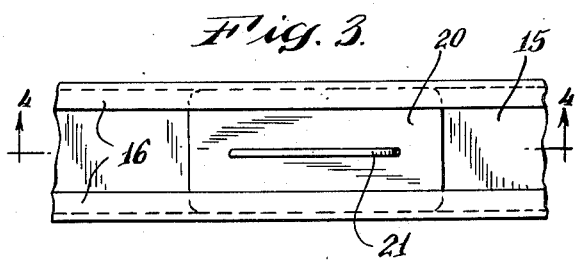
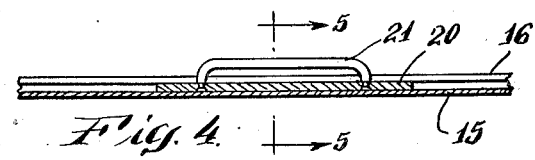
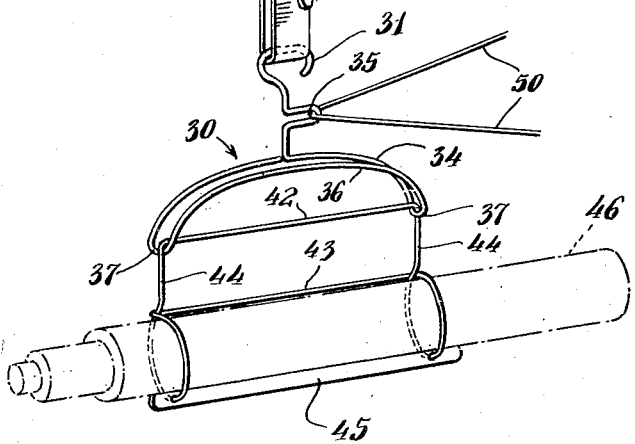
INVENTOR.
Edward A. Buckley
BY Alfred E. Gage
ATTORNEY.

March 30, 1954  E. A. BUCKLEY  2,673,705
ADJUSTABLE SUPPORTING ARRANGEMENT FOR SIGHTABLE
INSTRUMENTS IN A MOVING VEHICLE
Filed Nov. 30, 1950  2 Sheets-Sheet 2
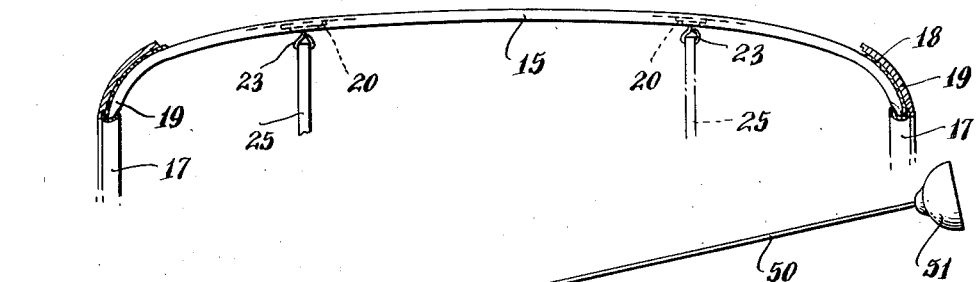
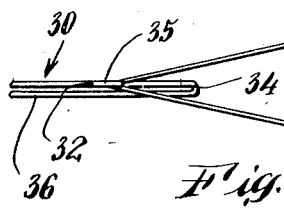
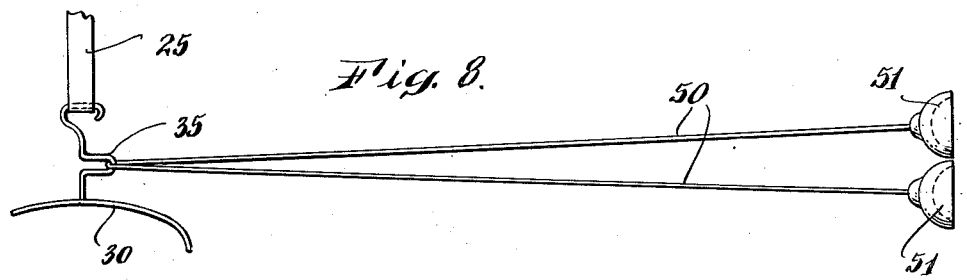
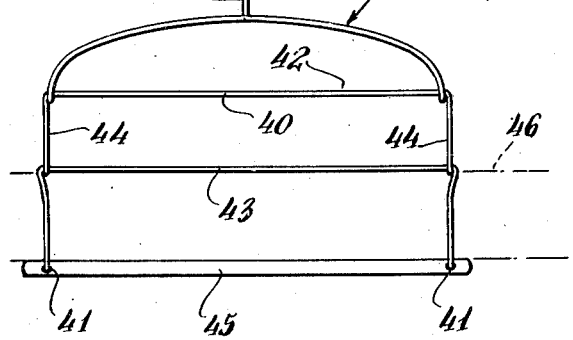
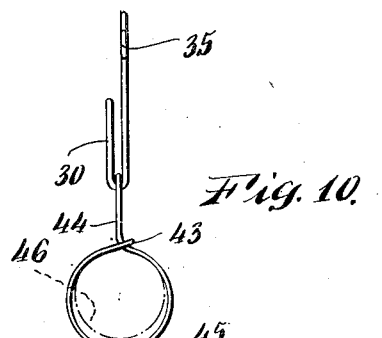
INVENTOR.
Edward A. Buckley
BY Alfred E. Page
ATTORNEY.

Patented Mar. 30, 1954

2,673,705

UNITED STATES PATENT OFFICE 2,673,705

ADJUSTABLE SUPPORTING ARRANGEMENT FOR SIGHTABLE INSTRUMENTS IN A MOVING VEHICLE

Edward A. Buckley, North Tarrytown, N. Y.

Application November 30, 1950, Serial No. 198,300

7 Claims. (Cl. 248—317)

This invention relates to an adjustable supporting arrangement for stably supporting spyglasses, cameras, or the like in operative position in a parked or moving vehicle such as an automobile, train, boat, or plane.

On trips through scenic territory, it is frequently desirable for a passenger, other than the operator, to take camera shots of passing scenery or observe distant scenes, such as mountains, seascapes, etc., through glasses such as monoculars and binoculars. As high-powered glasses and cameras require stable support for proper functioning, it is necessary to at least stop the car, and frequently to alight therefrom.

Stopping and parking frequently are not feasible, due to traffic congestion, narrow roads, local ordinances and the like. Consequently, to use glasses or a camera effectively and to eliminate the fatigue of holding the same, a stable support therefor must be provided in the moving vehicle while the user is sitting in a comfortable natural position. This involves considerations of economy, adjustability and compactness.

The present invention provides such an adjustable stable support directed by hand in an inexpensive manner, and the invention support may be compactly stored when not in use. To this end, the invention support includes a flexible track which may be snapped into position beneath the roof of a car with its ends engaged with the usual car body moldings on either side over the doors. A slide is arranged for movement along the track and has an adjustable length strap detachably secured thereto. The lower end of the strap carries a wire bracket having an offset loop therein. This loop receives a pair of cords having suction cups or upholstery pins on their outer ends, so that the cord ends may be releasably secured to any desired part of the car to form, with the strap, an inverted tripod.

The wire hanger acts as a spreader for a sling which may be secured to a monocular, camera, or the like, the sling including another spreader to assure extended stable contact with the supported article. The weight of the article, acting on the vertex of the inverted tripod assures a stable support for the article, and the flexible sling and wire hanger allow positional adjustment of the article in any direction directed by hand. For heavier articles, above five pounds, additional supports may be used as needed.

For an understanding of the invention principles, reference is made to the following description of a typical embodiment thereof as illustrated in the accompanying drawings. In the drawings:

Fig. 1 is a perspective view, partly in section, of a car interior illustrating a pair of the invention supports mounted therein.

Fig. 2 is a partial perspective view of the support arranged to mount a monocular.

Fig. 3 is a plan view of the flexible track and slide.

Fig. 4 is a sectional view on the line 4—4 of Fig. 3.

Fig. 5 is a sectional view on the line 5—5 of Fig. 4.

Fig. 6 is a transverse sectional view of a car roof illustrating the mounting of the flexible track.

Fig. 7 is a plan view of the support illustrating the flexible tripod legs.

Fig. 8 is an elevation view corresponding to Fig. 7.

Fig. 9 is a side elevation view of the hanger and sling.

Fig. 10 is an end elevation view of the hanger and sling.

Referring to the drawings, the support includes a flexible channel track 15 having re-entrant flanges 16. Track 15 may be a metal or plastic track similar to the holders for price tags commonly used on display counters. The track has a length slightly greater than the distance between a pair of opposite car window moldings 17, 17 as measured along the underside of the car roof 18. Thereby, track 15 may be mounted in position by bowing the track against the somewhat flexible upholstery of roof 18 (Figs. 1 and 6) and snapping the track ends 19, 19 into position over moldings 17, 17. Ends 19, 19 may be flattened, if desired.

Track 15 adjustably supports a slide 20, which may be a flat piece of plastic or metal engaged beneath flanges 16 and having a flat loop 21 of wire or the like suitably anchored thereto. In the mounted position of track 15, loop 21 depends from slide 20.

Loop 21 supports a loop shaped hook 23 engaged with the upper end of an adjustable length strap, or other suitable adjustable vertical support 25. For example, member 25 may be an adjustable length cord, wire, or rod, although a strap is preferred. This member forms the substantially vertical leg of the inverted tripod.

The lower end of member 25 has the sling hanger 30 secured thereto. In the illustrated embodiment, hanger 30 is formed of relatively stiff wire and somewhat resembles a coat hanger. Thus, the hanger has a flat hook 31 engaged with strap 25 and having a vertical extension 32 formed with a laterally extending bend 35 for a purpose to be described. Extension 32 is continued into a continuous wire loop which is bent to form a pair of substantially parallel arches 34, 36 interconnected by upwardly opening bights 37. The hanger may be formed of a single length of wire suitably bent to shape and having its ends interconnected on extension 32, in the manner usual with coat hangers.

Hanger 30 supports the sling 40, which lies in bights 37, the arches 34, 36 serving as a spreader for the upper rim of the sling. Sling 40 is a continuous loop of flexible material of suitable strength to support a camera, glass, or the like. For example, it may be a heavy cord. The sling extends through apertures 41, 41 near the ends of a lower spreader 45 of rigid plastic or other rigid light material. The bottom run 43 of sling 40 is looped over the vertical rims 44, 44 (Figs. 2, 9 and 10), the upper rim 42 lying in bights 37. The sling thus forms a pair of spaced supporting loops for the article to be suspended, such as a monocular 46.

The substantially horizontally extending legs of the inverted tripod are provided by flexible elements 50, 50 connected to loop or bend 35 of hanger 30, although a single, continuous member may be used for both elements. The outer ends of elements 50 interchangeably carry suction cups 51 or upholstery pins 52. Alternatively, the support may be supplied with several sets of elements 50 selectively having suction cups or upholstery clips on their outer end.

To use the support, glass 46, or a pair of binoculars, or a camera, are secured in sling 40, hook 23 carrying its attached parts having previously been engaged in loop 21. Slide 20 is adjusted to the desired position along track 15, and strap 25 adjusted as to length. Elements 50 then have their end attachments secured, in laterally spaced relation, to suitable supporting surfaces such as windshield 56, rear window 57, or seat 58, a suction cup 51 or pin 52 being used in accordance with the supporting surface.

Preferably, elements 50 extend somewhat upwardly from bend 35. Thereby, the weight supported in sling 40 has its gravitational force transmitted along three legs of a tripod, the apex being bend 35. One leg is the member 25 and the other legs are constituted by elements 50. Consequently, a laterally and vertically stable support is provided, which nevertheless permits orienting of the glass or camera.

While a specific embodiment of the invention has been shown and described in detail to illustrate the application of the invention principles thereto, it should be understood that the invention may be otherwise embodied without departing from such principles.

What is claimed is:

1. An instrument support for stably and adjustably positioning sightable instruments in a vehicle, said support comprising, in combination, elongated guide means detachably positionable against the underside of the vehicle roof; a slide adjustable along said guide means; said guide means being constructed and arranged to provide for free movement of said slide along substantially the entire length of said guide means; a first adjustable length flexible suspension element depending from said slide; a first spreader means secured to the lower end of said element; an endless sling, including a pair of spaced loops interconnected by upper and lower runs of the sling, having its upper run lying along said first spreader means; a second spreader means engaging and spacing apart the loops and in spaced relation to the upper run of said sling; the loops of said sling being supportingly engageable with an instrument; a pair of second flexible suspension elements secured to said first spreader means and extendable in diverging relation therefrom; and means on the outer ends of each of said second elements securable to a relatively fixed portion of the vehicle; whereby said three elements form an inverted tripod having its vertex at said first spreader means and stably positioning an instrument at a presettable fixed point in the vehicle.

2. A support as claimed in claim 1, in which said first spreader means comprises a hanger having a pair of substantially parallel arches interconnected at each end by upwardly opening bights receiving said sling.

3. A support as claimed in claim 1 in which said first spreader means comprises a hanger having a pair of substantially parallel arches interconnected at each end by upwardly opening bights receiving said sling, and a vertical extension secured to said first element and having an offset bend to which said second elements are attached.

4. A support as claimed in claim 1 in which said first spreader means comprises a hanger having a pair of substantially parallel arches interconnected at each end by upwardly opening bights receiving said sling, and a vertical extension secured to said first element and having an offset bend to which said second elements are attached; said second elements comprising a lineal filament having a fastening element on each end and having its intermediate portion engaged in such bend.

5. A support as claimed in claim 1 in which said second spreader means comprises a rigid, elongated bar having apertures at each end receiving said sling.

6. A support as claimed in claim 1 in which said first spreader means comprises a hanger having a pair of substantially parallel arches interconnected at each end by upwardly opening bights receiving said sling; and said second spreader means comprises a rigid, elongated bar having apertures at each end receiving said sling.

7. A support as claimed in claim 1 in which said first spreader means comprises a hanger having a pair of substantially parallel arches interconnected at each end by upwardly opening bights receiving said sling, and a vertical extension secured to said first element and having an offset bend to which said second elements are attached; said second elements comprising a lineal filament having a fastening element on each end and having its intermediate portion engaged in such bend; and said second spreader means comprises a rigid, elongated bar having apertures at each end receiving said sling.

EDWARD A. BUCKLEY.

References Cited in the file of this patent

UNITED STATES PATENTS

| Number | Name | Date |
| --- | --- | --- |
| 1,013,221 | Roush | Jan. 2, 1912 |
| 1,281,948 | Guiterman | Oct. 15, 1918 |
| 1,501,080 | Wickham | July 15, 1924 |
| 1,807,356 | Vance | May 26, 1931 |
| 2,120,619 | Matthiesen | June 14, 1938 |

FOREIGN PATENTS

| Number | Country | Date |
| --- | --- | --- |
| 14,331 | Great Britain | of 1900 |
| 143,142 | Germany | of 1903 |
| 444,534 | France | of 1912 |